United States Patent
Blum et al.

(10) Patent No.: US 12,544,738 B2
(45) Date of Patent: Feb. 10, 2026

(54) ANIONIC PGM CARBOXYLATE ASSISTED PGM NANOPARTICLE SYNTHESIS FOR EXHAUST GAS TREATMENT APPLICATIONS

(71) Applicants: Johnson Matthey Public Limited Company, London (GB); Johnson Matthey (Shanghai) Chemicals Limited, Shanghai (CN)

(72) Inventors: Jochem Alex Blum, Reading (GB); Hsiao-Lan Chang, Wayne, PA (US); Hai-Ying Chen, Wayne, PA (US); Nicola Collis, Reading (GB); Jennifer Marion Gabrielsson, Reading (GB); Gemma Louisa Moxham, Reading (GB); Nicoleta Muresan, Reading (GB); Dongsheng Qiao, Shanghai (CN); Emma Schofield, Reading (GB); David Thompsett, Reading (GB); Yaping Wan, Shanghai (CN)

(73) Assignees: JOHNSON MATTHEY PUBLIC LIMITED COMPANY, London (GB); JOHNSON MATTHEY (SHANGHAI) CHEMICALS LIMITED, Shanghai (CN)

( * ) Notice: Subject to any disclaimer, the term of this patent is extended or adjusted under 35 U.S.C. 154(b) by 134 days.

(21) Appl. No.: 17/811,602

(22) Filed: Jul. 11, 2022

(65) Prior Publication Data
US 2023/0018328 A1    Jan. 19, 2023

Related U.S. Application Data

(60) Provisional application No. 63/203,400, filed on Jul. 21, 2021.

(30) Foreign Application Priority Data

Jul. 12, 2021 (CN) .................. 202110782230.8

(51) Int. Cl.

| | | |
|---|---|---|
| *B01J 23/46* | (2006.01) | |
| *B01D 53/94* | (2006.01) | |
| *B01J 21/04* | (2006.01) | |
| *B01J 23/10* | (2006.01) | |
| *B01J 23/44* | (2006.01) | |
| *B01J 35/00* | (2024.01) | |
| *B01J 35/45* | (2024.01) | |
| *B01J 37/02* | (2006.01) | |
| *B01J 37/08* | (2006.01) | |
| *F01N 3/10* | (2006.01) | |
| *F01N 3/28* | (2006.01) | |
| *B01J 35/56* | (2024.01) | |

(52) U.S. Cl.
CPC .......... *B01J 23/464* (2013.01); *B01D 53/945* (2013.01); *B01J 21/04* (2013.01); *B01J 23/10* (2013.01); *B01J 23/44* (2013.01); *B01J 35/45* (2024.01); *B01J 37/0219* (2013.01); *B01J 37/086* (2013.01); *F01N 3/101* (2013.01); *F01N 3/2803* (2013.01); *F01N 3/2842* (2013.01); *B01D 2255/1023* (2013.01); *B01D 2255/1025* (2013.01); *B01J 35/56* (2024.01); *F01N 2370/04* (2013.01)

(58) Field of Classification Search
CPC . B01J 23/464; B01J 23/10; B01J 23/44; B01J 35/23; B01J 35/56; B01J 37/0219; B01J 37/086; B01D 53/945; F01N 3/101; F01N 3/2803; F01N 3/2842
See application file for complete search history.

(56) References Cited

U.S. PATENT DOCUMENTS

| | | | |
|---|---|---|---|
| 2008/0242533 A1 | 10/2008 | Saito | |
| 2015/0232405 A1* | 8/2015 | Walter | .............. C07C 51/412 562/597 |
| 2015/0321184 A1 | 11/2015 | Fedeyko et al. | |
| 2017/0304771 A1* | 10/2017 | Kiemel | .................. B01J 23/63 |
| 2017/0304773 A1 | 10/2017 | Onoe et al. | |
| 2018/0021756 A1* | 1/2018 | Karpov | ............... B01J 37/0236 423/213.5 |
| 2019/0099715 A1 | 4/2019 | Sakurada et al. | |

FOREIGN PATENT DOCUMENTS

| | | |
|---|---|---|
| CN | 1230899 A | 10/1999 |
| CN | 102284295 A | 12/2011 |
| CN | 103349984 B | 12/2014 |
| CN | 106457216 A | 2/2017 |
| CN | 107303468 A | 10/2017 |
| CN | 107405614 A | 11/2017 |
| CN | 108778501 A | 11/2018 |

(Continued)

OTHER PUBLICATIONS

Galvez-Martinez et al., Catalysis Communications, (2021), v.153, p. 106269 (1-6).*

(Continued)

*Primary Examiner* — Yong L Chu

(57) ABSTRACT

A method of manufacturing a catalyst article, the method comprising: providing an anionic complex comprising a PGM and a carboxylate ion; providing a support material; applying the anionic complex to the support material to form a loaded support material; disposing the loaded support material on a substrate; and heating the loaded support material to form nanoparticles of the PGM on the support material.

19 Claims, 2 Drawing Sheets

(56) References Cited

FOREIGN PATENT DOCUMENTS

| | | | |
|---|---|---|---|
| CN | 109641200 A | 4/2019 | |
| CN | 109794240 A | 5/2019 | |
| CN | 112118906 A | 12/2020 | |
| WO | 9631275 | 10/1996 | |
| WO | WO-2011066009 A2 * | 6/2011 | ........... B01D 53/864 |
| WO | WO-2014053351 A1 * | 4/2014 | ........... C07C 51/412 |
| WO | 2018/041632 A1 | 3/2018 | |
| WO | 20190219815 A1 | 11/2019 | |
| WO | 2020260669 A1 | 12/2020 | |

OTHER PUBLICATIONS

Carneiro, Marcell et al., Free Rhodium (II) Citrate and Rhodium (II) Citrate Magnetic Carriers as Potential Strategies for Breast Cancer Therapy, Journal of Nanobiotechnology 9:11, 2011.

Johnson, S. A. et al., "Preparation and Properties of Anhydrous Rhodium (II) Acetate and Some Adducts Thereof," Inorganic Chemistry, 2, 5, pp., 960-962, 1963.

Stephenson et al., "Carboxylates of Palladium, Platinum, and Rhodium, and their Adducts," Journal of the Chemical Society, 667, pp. 3632-3640, 1965.

* cited by examiner

ANIONIC PGM CARBOXYLATE ASSISTED PGM NANOPARTICLE SYNTHESIS FOR EXHAUST GAS TREATMENT APPLICATIONS

FIELD OF THE INVENTION

The invention relates to a method of manufacturing a catalyst article, a catalyst article obtainable by the method, an emission treatment system and a method of treating an exhaust gas.

BACKGROUND OF THE INVENTION

Platinum group metals (PGMs) are key components in exhaust gas catalysts, for example three-way catalysts (TWCs), diesel oxidation catalysts (DOCs) and $NO_x$ trap catalysts. To maximize the efficiency, it is desirable to selectively and/or reliably locate PGMs onto the target support materials. Conventional catalyst article preparation methods use simple PGM salts as the source of PGMs, typically PGM nitrates. However, using such conventional methods it is difficult to locate the PGMs onto certain support materials. This is because, when preparing the washcoat, the interaction between the support material and the PGMs is weak. To overcome this problem, methods including prefixing the PGMs onto the target support materials by impregnation followed by calcination, spray drying, and reduction-deposition have been considered. All of these approaches, however, require multiple/additional processing steps. Moreover, during calcination to secure the PGMs to the support materials, decomposition of the nitrates may cause the release of harmful $NO_x$ by-products.

Due to the lack of strong interactions between the PGMs and the support materials when using PGM nitrate precursors, metal migration is likely to occur, meaning that specific distinct layer arrangements within the catalyst articles may mix, which can cause deactivation of the layers when the layers are included for specific, different purposes, for example. Moreover, such catalysts articles can be susceptible to excessive wicking of the supported PGM catalysts through the substrate on being exposed to further wet applications of washcoats, particularly when using palladium.

Accordingly, there is a need to provide an improved method of manufacturing a catalyst article comprising PGMs supported on a support material, in particular one in which the PGMs may be more securely bonded to the support materials to avoid migration and/or wicking, fewer harmful by-products are released during manufacture and which requires fewer steps to simplify manufacture and reduce manufacturing costs.

WO96/31275 relates to PGM carboxylates, particularly PGM lactates, for use as precursors for the manufacture of catalyst articles. However, anionic PGM complexes are not described.

"Free rhodium (II) citrate and rhodium (II) citrate magnetic carriers as potential strategies for breast cancer therapy", Carneiro et al., Journal of Nanobiotechnology, 2011, 9:11; "Carboxylates of Palladium, Platinum, and Rhodium, and their Adducts", Stephenson et al., Journal of the Chemical Society, 1965, 667, 3632-3640; and "Preparation and Properties of Anhydrous Rhodium (II) acetate and Some Adducts Thereof", Johnson et al., Inorganic Chemistry, 1963, 2, 5, 960-962 each describe PGM carboxylate complexes. However, none of these publications is in the field of preparing catalyst articles for applications such as the treatment of exhaust gas.

SUMMARY OF THE INVENTION

One aspect of the present disclosure is directed to a method of manufacturing a catalyst article, the method comprising: providing an anionic complex comprising a PGM and a carboxylate ion; providing a support material; applying the anionic complex to the support material to form a loaded support material; disposing the loaded support material on a substrate; and heating the loaded support material to form nanoparticles of the PGM on the support material.

Another aspect of the present disclosure is directed to a catalyst article obtained by the method in the first aspect.

The invention also encompasses an exhaust system for internal combustion engines that comprises the catalyst article in the second aspect.

The invention also encompasses method of treating an exhaust gas, the method comprising: providing the catalyst article of the second aspect; and contacting the catalyst article with an exhaust gas.

DETAILED DESCRIPTION OF THE INVENTION

Figure 1:
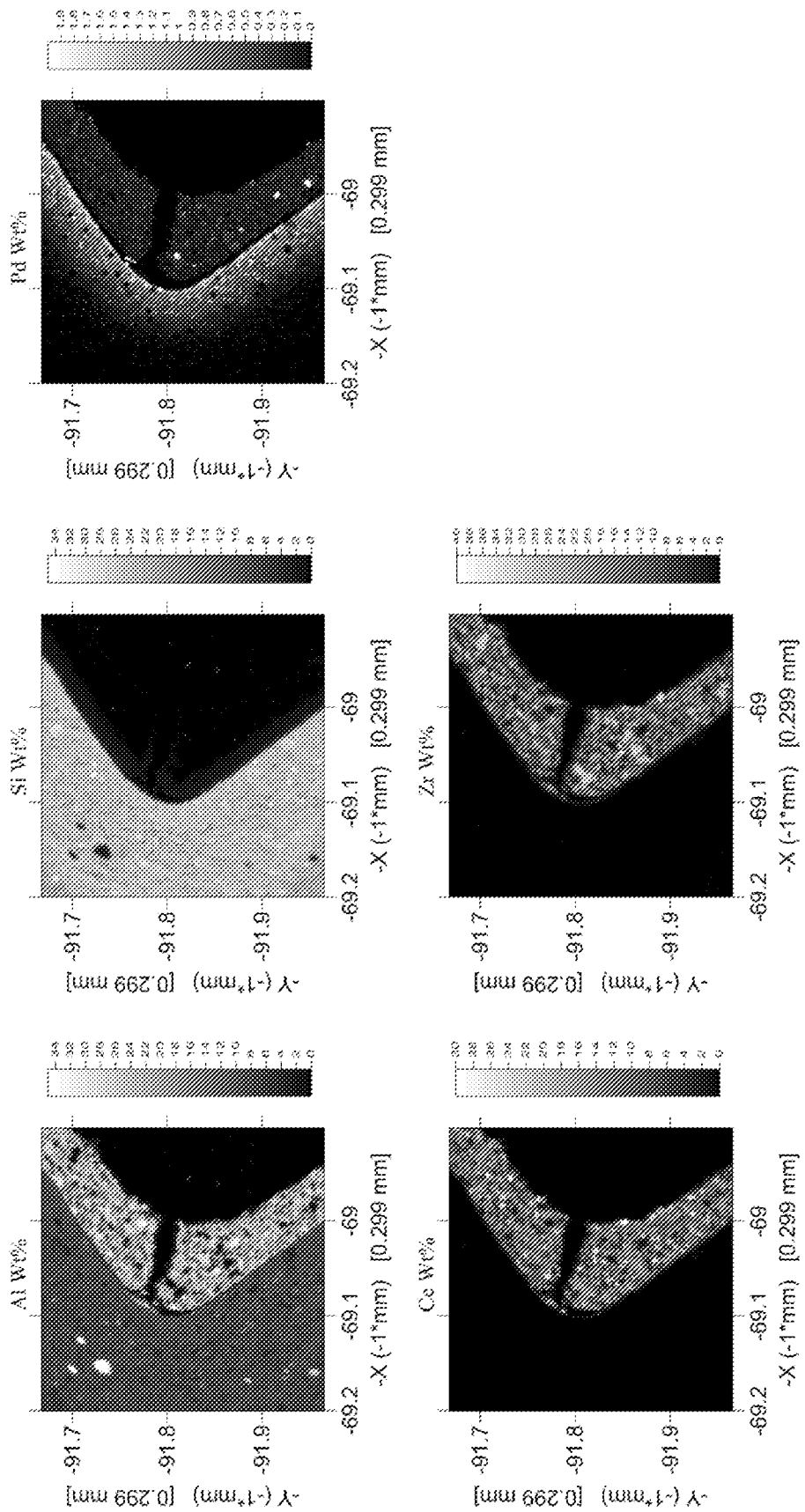
FIG. 1 shows the palladium distribution on a palladium citrate coated core by EPMA method (Example 6).

The present invention seeks to tackle at least some of the problems associated with the prior art or at least to provide a commercially acceptable alternative solution thereto.

In a first aspect, the present invention provides a method of manufacturing a catalyst article, the method comprising:
  providing an anionic complex comprising a PGM and a carboxylate ion;
  providing a support material;
  applying the anionic complex to the support material to form a loaded support material;
  disposing the loaded support material on a substrate; and
  heating the loaded support material to form nanoparticles of the PGM on the support material.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

Surprisingly, when used in an emission treatment system, the catalyst article manufactured by the method of the present invention may exhibit significantly less wicking of the washcoat layers through or into the substrate and/or mixing of the washcoat layers compared to catalyst articles prepared by conventional methods. In other words, catalyst articles manufactured by the method of the present invention may exhibit stronger/more reliable fixing of the PGMs to the support material compared to catalyst articles manufactured by conventional methods. As well as aesthetic improvements in such catalyst articles, the catalyst articles manufactured by the method of the present invention may therefore exhibit improved catalytic activity. This is at least because mixing of the catalytically-active PGMs between any distinct washcoat layers in the catalyst article may be reduced, which may thereby reduce the likelihood that any of the washcoat layers are deactivated. This, in turn, may help to maintain the catalytic activity of the overall catalyst article as high as intended when the catalyst article is fresh, as well as after ageing. Keeping the PGMs of any distinct washcoat layers within their intended respective layers is can be important for maintaining their intended catalytic purpose, whether for oxidation or reduction, for example. For example, it is known that direct interactions between Pd and Rh can reduce the catalytic activity of the individual components, especially the catalytic functions of the Rh component.

Without wishing to be bound by theory, it is thought that these surprising and advantageous properties demonstrated by catalyst articles manufactured by the method of the present invention may be achieved because of strong electrostatic interactions between the support material and the anionic complex. The interactions may be particularly strong when the method is performed at low pHs, for example at a pH of 8 or less. The anionic complex of the invention may be electrostatically attracted to the support material, which in general may have a (slight) positive charge in solution. Thus, the anionic complex may be less likely to detach from the loaded support material due to such electrostatic interactions. Moreover, when preparing a washcoat solution, the anionic complex may be attracted to the support material, thereby actively coming together in the solution to form the loaded support material. This may therefore result in a higher proportion of the PGM actually being supported (i.e. "fixed" or "loaded") on the support material. This is in contrast to traditional washcoating methods using a PGM nitrate precursor, for example, in which the neutral PGM nitrate and/or PGM cations will be "loose" in solution, i.e. without having a significant electrostatic attraction to the support material. It is also thought that due to such stronger interactions between the anionic complex and the support material, a more even dispersion of the PGM supported on the support material may be obtained throughout the catalyst article.

Advantageously, when heating and/or calcining the loaded support material to form nanoparticles of the PGM on the support material, due to the composition of the anionic complex, i.e. the carboxylate ion ligand, for example, compared to conventional methods using PGM nitrate precursors fewer harmful by-products such as $NO_x$ may be released. Without wishing to be bound by theory, it is thought that this is because while the nitrates may decompose to $NO_x$ on heating, the carboxylate ion ligands of the present invention may decompose to less harmful or "cleaner" by-products, such as simply carbon dioxide and water only, for example. In other words, on heating, the anionic complex of the present invention is thought to decompose/reduce to the PGM metal (or metal oxide/hydroxide), $CO_2$ and $H_2O$ only. Moreover, the anionic complexes of the present invention have been found to auto-reduce the PGM centre on heating. In other words, on heating, the ligands may decompose and reduce the PGM to the PGM metal without requiring any additional method steps such as chemical or gas-phase reduction in order to produce the catalyst in the active form, i.e. having supported PGM metal (nanoparticles).

Advantageously, the anionic complex of the present invention may also have high solubility in water. This is beneficial because this allows for conventional aqueous washcoating techniques to be used without the need to significantly modify the techniques, i.e. due to the change in precursor.

In comparison to WO96/31275, for example, in which the PGM precursor is not an anionic complex, the catalyst articles manufactured by the method of the present invention may therefore exhibit the above-described advantageous properties at least in part due to the increased electrostatic attraction between the PGM precursor and the support material.

The term "catalyst article" used herein may encompass an article in which a catalyst is supported thereon or therein. The article may take the form of, for example, a honeycomb monolith, or a filter, e.g. a wall flow filter or a flow-through filter. The catalyst article may be for use in an emission treatment system, in particular an emission treatment system for a gasoline engine, preferably a stoichiometric gasoline engine. The catalyst article may be for use in three-way catalysis, i.e. for use as a three-way catalyst (TWC). Alternatively, the catalyst article may be for use in an emission treatment system for a diesel engine. The catalyst article may be for use in diesel oxidation catalysis, i.e. for use as a diesel oxidation catalyst (DOC). The catalyst article may also be for use in $NO_x$ trap catalysis, i.e. for use as a $NO_x$ trap catalyst.

Providing an anionic complex comprising a PGM and a carboxylate ion typically involves providing the anionic complex in solution, for example an aqueous or alcohol solution, preferably in aqueous solution.

The term "anionic complex" as used herein encompasses any complex comprising at least one metal centre and at least one ligand, wherein the overall charge of the at least one metal centre and at least one ligand is less than zero. Accordingly, the anionic complex is typically associated with a positive counterion. Possible positive counterions are described further below.

The term "PGM" as used herein means "platinum group metal" and may comprise one or more of platinum, palladium, rhodium, ruthenium, osmium and iridium, for example. Preferably, the PGM comprises one or more of platinum, palladium and rhodium, depending on the intended application, such as for use as a TWC, DOC or $NO_x$ trap catalyst. The anionic complex may comprise one or more PGM metal centres. For example, the anionic complex may comprise two or more metal centres, such as two or three metal centres.

The term "carboxylate ion" as used herein takes its usual meaning in the art, i.e. a molecule of the general formula $RCOO^-$, with R being any group, typically any organic group. Typically, therefore, the carboxylate ion coordinates to the PGM metal via the $—COO^-$ group. However, the carboxylate ion may alternatively and/or in addition coordinate via another functional group, such as another $—COO^-$ group or a different functional group such as an $—OH$ group. The anionic complex may comprise one or more carboxylate ions, depending on the size and/or number of functional groups of the carboxylate ion, for example. R preferably consists of C, H and O. Advantageously, this may result in the anionic complex decomposing to the PGM metal (or metal oxide/hydroxide), $CO_2$ and $H_2O$ only. Preferable carboxylate ions for use in the present invention are discussed further below.

The support material may be any material that is capable of supporting the anionic complex and nanoparticles thereon or therein. The support material may take any form, but is typically in the form of a powder, more typically a high surface area powder. When the method of the present invention is used to prepare a catalysed filter, such as a wall flow filter or flow-through filter, the support material will typically be in the form of a powder having a D50 of, for example, from 0.1 to 25 μm, more typically from 0.5 to 5 μm as measured using TEM. Such particle sizes may facilitate desirable rheological properties of a slurry used to coat the filter. The support material may function as a washcoat. The support material may be a washcoat or may be part of a washcoat.

The support material may also serve as an oxygen storage material, which stores and releases oxygen respectively at fuel lean and fuel rich conditions, for facilitating the three-way catalytic conversion or other catalytic application.

Applying the anionic complex to the support material typically involves contacting the anionic complex and support material in the presence of a solvent (typically water) so as to produce a slurry. The term "slurry" as used herein may encompass a liquid comprising insoluble material, e.g. insoluble particles. The slurry may comprise (1) solvent; (2) soluble content, e.g. "free", uncomplexed carboxylate ions or carboxylic acid molecules, inorganic PGM and promoter precursor(s), and anionic complex (outside of the support, i.e. unsupported anionic complex); and (3) insoluble content, e.g. support particles with and without interactions with the anionic complex and metal precursors. Preferably, the slurry comprises mostly (1) and (3), such as 70 wt. % or greater of (1) and (3), based on the total weight of (1), (2) and (3), such as 80wt. % or greater of (1) and (3) or even 90 wt. % or greater of (1) and (3). The slurry is typically stirred, more typically for at least 10 minutes, more typically for at least 30 minutes, even more typically for at least an hour. Increased contacting and/or stirring times may increase the amount of anionic complex that is loaded onto the support material, in addition to that achieved by the theorised possible electrostatic interactions.

The term "loaded support material" as used herein may encompass a support material that has the anionic complex loaded thereon (e.g. on the surface of a high-surface area metal oxide support material) and/or loaded therein (e.g. within the pores of a zeolite support material). The anionic complex is typically fixed to the support, for example by electrostatic forces, hydrogen bonds, coordinate bonds, covalent bonds, and/or ionic bonds. For example, in the case of an oxide, which may have a positive charge, strong electrostatic forces may exist between the anionic complex and the support material. However, other interactions may also exist due to the functional groups of the (carboxylate ion) ligands, such as electrostatic forces or hydrogen bond formation due to the carboxylate functional group and/or other functional groups such as hydroxyl groups interacting with hydroxyl groups on the support.

The term "substrate" as used herein may encompass, for example, a ceramic or metallic honeycomb, or a filter block, e.g. a wall flow filter or flow-through filter. The substrate may comprise a ceramic monolithic substrate. The substrate may vary in its material composition, size and configuration, cell shape and density, and wall thickness. Suitable substrates are known in the art.

Disposing the loaded support material on a substrate may be carried out using techniques known in the art. Typically, the loaded support material is disposed on the substrate by pouring a slurry of the loaded support material into the inlet of the substrate using a specific moulding tool in a predetermined amount. As discussed in more detail below, subsequent vacuum and drying steps may be employed during the disposition step. When the support is a filter block, the loaded support material may be disposed on the filter walls, within the filter walls (if porous) or both.

Heating the loaded support material is typically carried out in an oven or furnace, more typically a belt or static oven or furnace, typically in hot air at a specific flow from one direction. The heating may comprise calcination. The heating may also comprise drying. The drying and calcination steps may be continuous or sequential. For example, a separate washcoat may be applied after the substrate is already washcoated and dried with a previous washcoat. A washcoated substrate can also be dried and calcined using one continuous heating program if coating is completed. During the heating, the anionic complex may at least partially, substantially or completely decompose. In other words, the ligands of the complex, i.e. the carboxylate ion, are at least partially, substantially or completely removed or separated from the PGM, and are removed from the final catalyst article. Particles of such separated PGMs may then begin to form metal-metal and metal-oxide bonds. As a result of the heating (calcination), the substrate is typically substantially free of carboxylate ions, more typically completely free of carboxylate ions.

The term "nanoparticle" as used herein may encompass a particle having a diameter of from 0.01 nm to 100 nm as measured by TEM. The nanoparticles may be in any shape, e.g. a sphere, a plate, cubic, cylindrical, hexagonal or a rod, but are typically spherical. The largest dimension of the nanoparticle (i.e. the diameter if the nanoparticle is spherical), will typically be from 0.5 to 10 nm, more typically from 1 to 5 nm, as measured by TEM.

Following the heating step, the substrate is typically cooled, more typically to room temperature. The cooling is typically carried out in air with or without cooling agent/media, typically without cooling agent.

The carboxylate ion preferably comprises two or more carboxyl functional groups, for example from two to four carboxyl functional groups. In some preferred embodiments, the carboxylate ion comprises two carboxyl functional groups. In other preferred embodiments, the carboxylate ion comprises three carboxyl functional groups. When the carboxylate ion comprises two or more carboxyl functional groups, for example, at least one of the carboxyl functional groups may coordinate to the one or more metal centres of the anionic complex. For example, without wishing to be bound by theory, in some embodiments two or more of the carboxyl functional groups may coordinate to the one or more metal centres of the anionic complex, such as to form a chelating ligand or a bridging ligand. In other embodiments, for example, without wishing to be bound by theory it is thought that one or more of the carboxyl functional groups may interact with the support material, such as to form electrostatic interactions and/or hydrogen bonds with any exposed hydroxyl groups on the (oxide) support material, for example. These interactions may be in addition to the coordination of one or more of the carboxyl functional groups to the one or more metal centres of the anionic complex. Without wishing to be bound by theory, it is thought that in this case these additional interactions, i.e. in addition to any electrostatic interactions as described above due to being an anionic complex, may also contribute to the above-described advantageous properties of the anionic complexes of the present invention, such as to provide an even stronger interaction or "bond" with the support material.

In preferred embodiments, the carboxylate ion comprises from 2 to 6 carbon atoms, such as 2, 3, 4, 5 or 6 carbon atoms. The number of carbon atoms in the carboxylate ion may not be particularly limited in order to achieve the invention. However, without wishing to be bound by theory, it is thought that the higher the number of carbon atoms of the carboxylate ion, the less soluble in water the resulting anionic complex will be. It may be desirable for the anionic complex to have high solubility in water. Accordingly, it is thought that it may be desirable for the number of carbon atoms in the carboxylate ion to not exceed six, for example. It may be desirable for the anionic complex to have high solubility in water at least because conventional washcoating techniques are performed in aqueous solutions. Thus, for the PGM precursor, i.e. anionic complex, of the present invention to be used in conventional washcoating techniques, i.e. so that the conventional techniques may not need to be substantially adapted, it may be desirable that the anionic complex has high solubility in water. Moreover, it may therefore be desirable that the carboxylate ion used in the anionic complex of the present invention has a good balance between higher solubility in water, such as by having fewer carbon atoms, for example, and having stronger interactions or "bonds" with the support material, such as by having a more negative charge on the anionic complex and/or by having more interactions such as electrostatic or hydrogen bonds with the support materials, such as due to the carboxylate ion having more functional groups, such as carboxyl or hydroxyl functional groups, for example.

In some preferred embodiments, therefore, the carboxylate ion comprises a hydroxyl group, preferably an alpha-hydroxy acid functional group. Without wishing to be bound by theory, it is thought that such functional groups may increase the number and/or strength of the attraction or interactions between the anionic complex and the support material.

Preferably, the carboxylate ion comprises one or more of citrate, malate, malonate, succinate, tartrate, glutarate, tartronate, oxalate, lactate and glycolate, more preferably one or more of citrate, malate, malonate, succinate, tartrate, glutarate, tartronate and oxalate, even more preferably the carboxylate ion comprises citrate and/or malonate. Such carboxylate ions when used in the anionic complex of the present invention have surprisingly been found to demonstrate strong interactions with the support material and therefore demonstrate the advantageous effects described herein particularly well.

Preferably, the PGM is selected from one or more of rhodium, palladium, platinum and ruthenium. More preferably, the PGM comprises, consists essentially of or consists of rhodium, palladium, platinum or a combination thereof, preferably rhodium and/or palladium. In some preferred embodiments, the PGM comprises, consists essentially of or consists of rhodium. In some preferred embodiments, the PGM comprises, consists essentially of or consists of platinum. In some preferred embodiments, the PGM comprises, consists essentially of or consists of palladium. The selection of each of platinum, palladium and/or rhodium for use in the present invention may depend on the particular purpose of the catalyst article, i.e. whether for reduction or oxidation, such as for TWC or DOC applications, for example. The different applications of each of platinum, palladium and/or rhodium are known to those skilled in the art.

Particularly preferred anionic complexes include one or more of Pt(IV) malonate, Pt(IV) succinate, Pt(II, IV) oxalate, Pd(II) citrate, Pd(II) lactate, Pd(II) oxalate, Pd(II) glycolate, Pd(II) malate, Rh(II) citrate, Rh(III) citrate, Rh(II) lactate, Rh(III) lactate and Ru(III) oxalate, more preferably one or more of Pt(IV) malonate, Pd(II) citrate, Rh(II) citrate and Rh(III) citrate, for example.

In preferred embodiments the anionic complex is provided in the form of an aqueous solution comprising the anionic complex, preferably wherein the aqueous solution has a pH of 8 or less, more preferably 7 or less. The use of an aqueous solution may provide a simple, low-cost process that is in line with more conventional washcoating processes so that, for example, the known techniques and additives may not need to be significantly altered when using the PGM precursor, i.e. anionic complex, of the present invention. This may therefore enable a facile transition from using traditional methods of manufacturing a catalyst article to the improved method of the present invention. As a result of the methods of providing the anionic complex for use in the method of the present invention, such an aqueous solution may comprise other components, such as "loose" or uncoordinated ligands, for example carboxylate ions or carboxylic acids. For example, the aqueous solution may also comprise additional acetic acid and/or acetate ions due to the method of providing the anionic complex.

Preferably, at least 70 wt. % of the PGM present in the aqueous solution is present in the form of the anionic complex described herein, more preferably at least 80 wt. %, even more preferably at least 90 wt. %, most preferably substantially all, or even all of the PGM present in the aqueous solution is present in the form of the anionic complex described herein. In other words, preferably, other PGM complexes are not present in the aqueous solution, nor are uncomplexed PGM particles, atoms and/or ions.

It may be desirable that the aqueous solution has a pH of 8 or less, preferably 7 or less, more preferably 6 or less. Without wishing to be bound by theory, it is thought that such a low pH may help to increase the electrostatic attraction between the anionic complex and the support material. This may be because the support material gains and maintains more of a positive charge in such pHs, due to associated $H^+$ ions in the aqueous solution, for example. This may be particularly apparent when the support material comprises an oxide, for example. However, this effect due to the pH of the aqueous solution may be observed when using any suitable support material. The use of an aqueous solution with such low pHs may therefore help to contribute to the above-described increased electrostatic attraction between the anionic complex and the support material, which may thereby help to achieve the above-described advantageous effects associated with increased attraction between the anionic complex and the support material. In other words, a lower pH, such as a pH of 8 or less, may help contribute to an even further increased attraction between the anionic complex and support material, thereby increasing the effect of the surprising results achieve by the method of the invention. Moreover, such a low pH may help to provide an anionic complex wherein the counterion is a proton or hydroxonium ion.

Preferably, the aqueous solution does not comprise a PGM nitrate. This may be at least due to the above-described properties associated with PGM nitrates that the present invention seeks to improve upon, such as higher specificity to locate the PGMs on the support material, stronger fixing of the PGMs to the support material and production of "less harmful" by-products on decomposition of the PGM precursor, for example. In other words, the present invention seeks to improve upon the conventional methods of manufacturing catalyst articles that use PGM nitrate precursors, and therefore the method of the present invention preferably does not involve the use of PGM nitrates.

When the anionic complex is provided in the form of an aqueous solution comprising the anionic complex, the anionic complex preferably has a counterion, the counterion preferably comprising one or more of $H^+$, $H_3O^+$ and $NH_4^+$, preferably consisting of $H^+$ and/or $H_3O^+$. Preferably, the aqueous solution does not comprise elemental inorganic cations. For example, the counterion preferably does not comprise elemental inorganic cations. This may be so that the resulting catalyst article may not be contaminated with such inorganic elements, for example. Such an aqueous solution may also help to achieve a desirable "clean" decomposition of the anionic complex during the heating step. Such elemental inorganic cations may include, for example, cations of one or more of sodium, potassium, magnesium and/or calcium (non-exhaustive).

The anionic complex may comprise one or more further ligands selected from water, $OH^-$, an acetate ion and a bridging O atom, for example. Preferably, the ligands of the anionic complex comprise, consist essentially of or consist of one or more of the carboxylate ion(s), water, $OH^-$, and a bridging O atom, depending on the particular carboxylate ion(s) used. Preferably, the anionic complex does not comprise a phosphorus- and/or nitrogen-containing ligand. Such anionic complexes may therefore help to achieve the desired "green" decomposition upon heating, such as to form only the PGM nanoparticles and released $CO_2$ and water on heating, for example. This is in contrast to conventional methods using PGM nitrate precursors, for example.

In some embodiments, the anionic complex comprises more than one PGM centre, for example two or three PGM centres. Such anionic complexes may therefore contain bridging ligands, such as bridging O atoms and/or bridging carboxylate ions which may have two or more functional groups, such as two or more carboxyl functional groups and/or an additional hydroxyl group.

The support material preferably comprises an oxide, preferably one of more of $Al_2O_3$, $SiO_2$, $TiO_2$, $CeO_2$, $ZrO_2$, $CeO_2$-$ZrO_2$, $V_2O_5$, $La_2O_3$ and zeolites. The oxide is preferably a metal oxide. The support material more preferably comprises alumina, even more preferably gamma-alumina. The support material preferably comprises ceria-zirconia. The support material preferably comprises alumina and ceria-zirconia. The alumina and/or ceria-zirconia is preferably doped, more preferably with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium, or sodium; even more preferably with an oxide of lanthanum, neodymium, praseodymium or yttrium. Such doped oxides are particularly effective as support materials. Preferably, the dopant is present in the alumina and/or ceria-zirconia in an amount of from 0.001 wt. % to 20 wt. %, and more preferably from 0.5 wt. % to 10 wt. %. Such support materials may be particularly appropriate for use in the method of the present invention in preferred embodiments when the anionic complex is provided in the form of an aqueous solution comprising the anionic complex, preferably wherein the aqueous solution has a pH of 8 or less, more preferably 7 or less. This may be because such support materials described above may desirably obtain a positive charge in such conditions, resulting in a strong electrostatic attraction between the support material and the anionic complex.

In certain preferred embodiments, the support material comprises a molecular sieve, such as a zeolite. Zeolitic support materials, for example, may be more prone to migration of PGM atoms/cations, particularly palladium, due to the porous structure. Migration may be from the surface of the substrate to within the substrate, for example, which may lead to deactivation of the catalyst article. Thus, decreasing the likelihood of migration may be beneficial since it may mean that a higher concentration of the PGM may remain on or close to the surface of the substrate after ageing, thereby maintaining the desirable level of catalytic activity for longer. Accordingly, the method of the present invention may also be particularly beneficial for zeolitic support materials. This is because the method of the present invention may reduce the likelihood of PGM migration as described above, in part due to the increased electrostatic attraction between the anionic complex and the support material. In low pH aqueous solutions, for example, the zeolitic support material may also obtain a positive charge, and any functional groups, such as carboxyl and/or hydroxyl functional groups may also interact with the zeolite framework, which may in turn reduce the likelihood of migration of the PGM.

The support material is preferably in the form of a powder having a D90 of from 0.1 to 25 µm, preferably from 0.5 to 20 µm, more preferably from 1 to 15 µm, measured by TEM, for example.

Providing the anionic complex preferably comprises: providing a PGM hydroxide and/or a water-insoluble PGM salt, preferably a PGM acetate; contacting the PGM hydroxide and/or water-insoluble PGM salt with an aqueous carboxylic acid solution; and optionally recovering the anionic complex in the form of an aqueous solution comprising the anionic complex. In other words, the anionic complex may be provided in situ in the method of the present invention, or alternatively the anionic complex may be manufactured at a separate time and stored before use in the present invention, such as for use as a preformed precursor. The term "water-insoluble PGM salt" as used herein encompasses a salt of a PGM that does not substantially dissociate in water, for example less than 5 wt. %, 3 wt. % or 1 wt. % of the PGM salt dissociates in water and/or one in which the solubility in water is very low, such as less than 10 mg/L. When a PGM acetate is used, for example, any remaining acetic acid or acetate ions may remain in the solution. Without wishing to be bound by theory, it is not thought that such substances remaining in solution negatively impacts the effects of the method of the present invention. Preferably, the aqueous solution comprising the anionic complex has a pH of 8 or less, more preferably 7 or less. Preferably, the counterion of the anionic complex is $H^+$ and/or $H_3O^+$. Preferably, the PGM of the PGM hydroxide is rhodium and/or platinum, and/or the PGM of the water-insoluble PGM salt, preferably PGM acetate, is palladium. It has been found that such combinations may be particularly suitable for use in the present invention.

Applying the anionic complex to the support material preferably comprises contacting the support material with an aqueous solution comprising the anionic complex, preferably wherein contacting the support material with the aqueous solution is carried out at a pH of 8 or less, more preferably 7 or less.

The loaded support material is preferably disposed on the substrate in the form of a slurry, preferably wherein the slurry has a pH of 8 or less, more preferably 7 or less. A slurry is particularly effective at disposing a material onto a substrate, in particular for maximized gas diffusion and minimized pressure drop during catalytic conversion. The slurry is preferably prepared by a method comprising: applying the anionic complex to the support material according to the method described above; and optionally adding one or more of an oxygen storage material, preferably ceria-zirconia; a promoter salt; a binder; an acid or a base; a thickening agent; and a reducing agent to the aqueous solution.

Such a "one-pot" preparation method may be simplified and lower cost in comparison to conventional methods. It may also maximize utilization of the anionic complex.

In other words, steps of providing an anionic complex comprising a PGM and a carboxylate ion; providing a support material; applying the anionic complex to the support material to form a loaded support material; and disposing the loaded support material on a substrate may comprise:
  providing a PGM hydroxide and/or a water-insoluble PGM salt, preferably a PGM acetate;
  contacting the PGM hydroxide and/or water-insoluble PGM salt with an aqueous carboxylic acid solution; and
  optionally recovering the anionic complex in the form of an aqueous solution comprising the anionic complex;
  contacting the support material with an aqueous solution comprising the anionic complex to form a slurry, preferably wherein contacting the support material with the aqueous solution is carried out at a pH of 8 or less, more preferably 7 or less;
  optionally adding one or more of an oxygen storage material, preferably ceria-zirconia; a promoter salt; a binder; an acid or a base; a thickening agent; and a reducing agent to the aqueous solution; and
  disposing the slurry on the substrate.

The loading may comprise washcoating. Conventional washcoating techniques are known in the art.

Preferably, each of the steps of applying the anionic complex to the support material, disposing the loaded support material on the substrate and heating the loaded support material is carried out at a pH of 8 or less, preferably 7 or less. For the avoidance of doubt, for all method steps wherein the anionic complex has not yet decomposed, it is preferred that said method step is carried out at a pH of 8 or less, preferably 7 or less for the reasons described herein.

The slurry preferably has a solids content of from 10 to 40%, preferably from 15 to 35%. Such a solids content may enable slurry rheologies suitable for disposing the loaded support material onto the substrate. For example, if the substrate is a honeycomb monolith, such solid contents may enable the deposition of a thin layer of washcoat onto the inner walls of the substrate. If the substrate is a wall flow filter, such solids contents may enable the slurry to enter the channels of the wall flow filter and may enable the slurry to enter the walls of the wall flow filter.

Preferably, the slurry further comprises one or more of:
  an oxygen storage material, preferably ceria-zirconia;
  a promoter salt;
  a binder;
  an acid or a base;
  a thickening agent; and
  a reducing agent.

Promotors may include, for example, a non-PGM transition metal element, a rare earth element, an alkali group element, and/or a combination of two or more of the above elements within the same or different groups in periodic table. The promotor salt may be a salt of such elements.

Binders may include, for example, an oxide material with small particle size to bind the individual insoluble particles together in washcoat slurry. The use of binders in washcoats is well known in the art.

Thickening agents may include, for example, a natural polymer with functional hydroxyl groups that interacts with insoluble particles in washcoat slurry. It serves the purpose of thickening washcoat slurry for the improvement of coating profile during washcoat coating onto substrate. It is usually burned off during washcoat calcination. Examples of specific thickening agents/rheology modifiers for washcoats include galactomannan gum, guar gum, xanthan gum, curdlan schizophyllan, scleroglucan, diutan gum, Whelan gum, hydroxymethyl cellulose, carboxymethyl cellulose, hydroxyethyl cellulose, methyl cellulose, methyl hydroxyethyl cellulose, methyl hydroxypropyl cellulose and ethyl hydroxycellulose.

The term "reducing agent" as described herein may encompass a compound that can reduce the PGM cations to particles in its metallic state in situ during washcoat preparation.

A further organic acid can be added that acts as a reductant for PGM and/or creates a reducing environment during the later heating/calcinating step. However, as described above, preferably the further organic acid is not added because it may not be necessary due to the auto-reducing properties of the anionic complex. Examples of a suitable organic acid may include citric acid, succinic acid, oxalic acid, ascorbic acid, acetic acid, formic acid, tannic acid, and combinations thereof.

The method preferably further comprises disposing a further slurry on the substrate, the further slurry comprising one or more of a further support material; an oxygen storage material; a promoter salt; a binder; an acid or a base; a thickening agent; and a reducing agent, wherein disposing the further slurry on the substrate takes place before disposing the loaded support material on the substrate and/or after heating the loaded support material to form nanoparticles of the PGM on the support material. In other words, the further slurry may form another catalyst layer or catalytic region on the substrate, thereby resulting in a catalyst article having multiple layers and/or regions of washcoats, for example. Due to the advantageous properties of the anionic complex described herein, during such a process the supported PGMs may be more likely to remain in their intended layers and/or regions.

Alternatively, the method preferably further comprises disposing a further slurry on the substrate, the further slurry comprising one or more of a further anionic complex comprising a PGM and a carboxylate ion; a further support material; an oxygen storage material; a promoter salt; a binder; an acid or a base; a thickening agent; and a reducing agent, wherein disposing the further slurry on the substrate takes place after disposing the loaded support material on the substrate and before heating the loaded support material to form nanoparticles of the PGM on the support material. In other words, in the method of the present invention it may be possible to eliminate the need for a further calcination step between the applications of each washcoat layer.

Disposing the loaded support material on a substrate preferably comprises contacting the slurry with the substrate (e.g. pouring the slurry into an inlet of the substrate) and optionally:
  applying a vacuum to the substrate, and/or
  drying the slurry on the substrate.

This may result in a favourable distribution of the loaded support material on the substrate.

The drying preferably occurs:
  at a temperature of from 60° C. to 200° C., more preferably from 70° C. to 130° C.; and/or
  for from 10 to 360 minutes, preferably from 15 to 60 minutes.

The substrate may be a "blank", i.e. un-washcoated, substrate. Alternatively, the substrate may have one or washcoats already loaded thereon. In such a situation, the final catalyst article may comprise multiple layers of different washcoats.

The substrate preferably comprises cordierite. Cordierite substrates are particularly suitable for use in catalyst articles.

The substrate is preferably in the form of a honeycomb monolith, a wall flow filter or a flow through filter.

The heating is preferably carried out:
at a temperature of from 400° C. to 700° C., preferably from 400° C. to 600° C., more preferably from 450° C. to 600° C.; and/or
for from 10 to 360 minutes, preferably from 35 to 120 minutes.

Lower temperatures and/or shorter heating times may result in insufficient decomposition of the anionic complex and/or may result in high levels of the carboxylate ion ligands remaining in the substrate. Higher temperatures and/or longer heating times may lead to the particles of PGM having an unfavourably large particle size, presumably due to sintering. Higher temperatures and longer heating times may also lead to damage to the catalyst article.

The heating preferably comprises calcining. The term "calcining" as used herein may encompass a thermal treatment process in the absence of, or limited supply of, air or oxygen to bring about a thermal decomposition.

The nanoparticles preferably have a D50 of from 0.1 nm to 25 nm, preferably from 0.2 to 10 nm, more preferably from 0.2 to 5 nm. The D50 may be measured by TEM. Such particle sizes may result in a favourable level of catalytic activity and may be less susceptible to agglomeration and sintering after ageing, i.e. after use in an exhaust system.

In a further aspect, the present invention provides a catalyst article obtainable by the method described herein, the catalyst article for use in an emission treatment system. In comparison to conventional catalyst articles, for example, the PGM may be less likely to undergo migration between any catalyst layers and/or regions, which is thought at least partly due to stronger and more reliable fixing of the PGM to the support material. Thus, each layer and/or region of the catalyst article may remain at a desired level of activity for longer. Significant wicking may also be less likely.

The catalyst article is preferably for three-way catalysis.

The catalyst article is preferably for diesel oxidation catalysis.

The catalyst article is preferably for $NO_x$ trap catalysis.

The catalyst article may have a washcoat loading of from 0.5 $g/in^3$ to 8 $g/in^3$, or 1 $g/in^3$ to 3 $g/in^3$. Such a catalyst article may exhibit similar or higher catalytic activity in comparison to conventional catalyst articles but may be lower cost in view of the lower levels of PGM employed.

The substrate preferably comprises a wall flow filter substrate or a flow-through substrate.

In a preferred embodiment, the catalyst article comprises a first catalytic region comprising a first PGM component and optionally further comprising a second catalytic region comprising a second PGM component. Preferably, the first catalytic region is supported/deposited directly on the substrate. Preferably, the second catalytic region is supported/deposited directly on the substrate. Preferably, the first and/or second PGM component is selected from the group consisting of platinum palladium, rhodium and a mixture of two or more thereof. Preferably, the first PGM component and the second PGM component are different. Preferably, the first PGM component is palladium and the second PGM component is rhodium, for example.

The catalyst article preferably comprises from 0.1 $g/ft^3$ to 50 $g/ft^3$ rhodium, more preferably from 0.5 $g/ft^3$ to 25 $g/ft^3$ rhodium, even more preferably from 1 $g/ft^3$ to 20 $g/ft^3$ rhodium, such as from 2 $g/ft^3$ to 15 $g/ft^3$ rhodium.

The catalyst article preferably comprises from 1 $g/ft^3$ to 300 $g/ft^3$ platinum, more preferably from 2 $g/ft^3$ to 200 $g/ft^3$ platinum, even more preferably from 5 $g/ft^3$ to 150 $g/ft^3$ platinum, such as from 10 $g/ft^3$ to 100 $g/ft^3$ platinum.

The catalyst article preferably comprises from 1 $g/ft^3$ to 300 $g/ft^3$ palladium, more preferably from 2 $g/ft^3$ to 200 $g/ft^3$ palladium, even more preferably from 5 $g/ft^3$ to 150 $g/ft^3$ palladium, such as from 10 $g/ft^3$ to 100 $g/ft^3$ palladium.

In a further aspect, the present invention provides an emission treatment system comprising the catalyst article described herein.

In some embodiments, the emission treatment system can be for an internal combustion engine. The emission treatment system is preferably for a gasoline engine.

The gasoline engine preferably operates under stoichiometric conditions.

In a further aspect, the present invention provides a method of treating an exhaust gas, the method comprising:
providing the catalyst article described herein; and
contacting the catalyst article with an exhaust gas.

In some embodiments, the emission treatment system can be for an internal combustion engine. The exhaust gas is preferably an exhaust gas from a gasoline engine. The catalyst article is particularly suitable for treating such exhaust gas. The gasoline engine preferably operates under stoichiometric conditions.

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g., region) where the difference in composition when comparing one part of the region with another part of the region is 5% or less, usually 2.5% or less, and most commonly 1% or less.

The term "washcoat" is well known in the art and refers to an adherent coating that is applied to a substrate usually during production of a catalyst.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

By "slurry", we mean a liquid comprising insoluble matter e.g. insoluble particles.

Any reference to an amount of dopant, particularly a total amount, expressed as a % by weight as used herein refers to the weight of the support material or the refractory metal oxide thereof.

The term "loading" as used herein refers to a measurement in units of g/ft$^3$ on a metal weight basis.

Where the present specification refers to "a" or "an", this encompasses the singular and plural forms.

The invention will now be described in relation to the following non-limiting examples.

EXAMPLES

Manufacture of Anionic Complex Precursors

A number of anionic complex precursors were prepared according to the following examples:

Example 1: Pd Citrate

Solid Pd acetate (6.33 g) was charged to a round bottom flask and 1.1 eq. citric acid (6.51 g) dissolved in 50 ml water was added. The mixture was heated at 75° C. for 6 hr until complete dissolution. This gave a resulting deep red solution. The solution was filtered using 542 filter paper to remove any remaining solid impurities. The UV/VIS spectrum showed a peak at 388 nm. ICP (Inductively Coupled Plasma analysis) gave a Pd assay of 5.73wt % Pd.

Example 2: Rh (III) Citrate

RhCl$_3$ solution (46.46 g, 21.52% Rh) was diluted with water (150 mL) and K2CO3 (5 M solution) was added dropwise until the pH of the solution had increased from 1.29 to 2.5 (to neutralise the free HCl present) over a 15 minute period. Further 5 M K2CO3 solution was added dropwise until the pH had reached 7.5. The mixture was heated at 40° C. At this stage the solution turned red. Further K2CO3 solution was added to raise the pH to 10.8 and then heated at 100° C. for two hours, during which a yellow brown precipitate formed. The solid was filtered and washed with DI water until the conductivity had reached 60 mS. The hydroxide was mixed with citric acid (40.84 g) and heated at 100° C., during which the hydroxide dissolved in less than 4 h. ICP gave a Rh assay of 6.52 wt % Rh and a Cl assay of 20 ppm Cl.

Example 3: Rh (III) Citrate (Alternative Method)

RhCl$_3$ solution (106.27 g, 19.29% Rh) was diluted with water (300 mL). NaOH (5 M solution) was added dropwise until the pH of the solution had increased from 1.29 to 2.5 (to neutralise the free HCl present) over a 15 minute period. 5 M NaOH solution was continued to be added dropwise until the pH had reached 7.5. The mixture was heated at 40° C. to give a cloudy red solution. NaOH solution was continued to be added until the pH reached 10 and was stirred for 4 hrs while maintaining the temperature at 40° C., by which time a Rh(OH)$_3$ precipitate had formed. After cooling down the precipitate was filtered washed with DI H$_2$O until the solution conductivity had reached 70 mS. A solution of citric acid (83.72 g) in water (400 ml) was prepared. The Rh(OH)$_3$ precipitate was added to this and the mixture stirred and heated at 100° C. The hydroxide dissolved within 3 hours. The solution was filtered on a 542 filter and concentrated by evaporation to approx. 8% Rh concentration. ICP gave a Rh assay of 8.01% Rh.

Manufacture and Testing of Catalyst Articles

A number of catalyst articles were prepared according to the following examples:

Example 4: Pd Uptake Comparison vs. Conventional Methods

Table 1 compares the Pd uptake values on an alumina supported CeZrO$_2$ mixed oxide (ACZ with a composition of Al$_2$O$_3$:Ce$_2$:ZrO$_2$=64:21:15) using palladium citrate or palladium nitrate as the Pd precursor. The experiments were conducted by adding the Pd precursor to a slurry of the ACZ support targeted at a 2.3 wt % of Pd loading. After mixing for 90 minutes, the mixture was centrifuged and the Pd content in the supernatant was analysed. The Pd uptake value was calculated by the percentage of Pd adsorbed on the surface of the ACZ support. The results demonstrate that Pd citrate resulted in a 90% Pd adsorption on the ACZ support as compared to a 60% Pd adsorption when Pd nitrate was used.

TABLE 1

| Pd precursor | Uptake value (% of Pd adsorbed) |
| --- | --- |
| Pd nitrate | 60% |
| Pd citrate | 90% |

Example 5: Performance Comparison of Catalyst Article of Present Invention vs. Conventional PGM Precursor

Comparative Catalyst A

A single-layered PdRh TWC with only one catalytic region was prepared. The catalytic region consists both of Pd and Rh, which were mixed in one slurry, supported on a washcoat of CeZr mixed oxide, Ceria-Zirconium-Alumina and alumina sol as binder, Pd nitrate solution as Pd source is used during the washcoat slurry preparation, The total washcoat loading of the catalytic region was about 3.5 g/in$^3$ with a Pd loading of 48 g/ft$^3$ and a Rh loading of 2 g/ft$^3$.

This washcoat was then coated from the each face of a ceramic substrate (400 cpsi, 6 mil wall thickness, 4.16 inch in diameter and 4 inch in length) using standard coating procedures with coating depth targeted of 50% of the substrate length for each coating, dried at 100° C. and calcined at 500° C. for 45mins.

Catalyst B

Catalyst B was prepared according to the similar procedure as Comparative Catalyst A with the exception that, Pd citrate solution as Pd source was used during washcoat slurry preparation in the catalytic region. Comparative Catalyst A and Catalyst B were both identical composition but using different palladium precursors.

Catalyst B and Comparative Catalyst A were bench aged for 100 hours with an average temperature of close-coupled brick at 875° C. vehicle emission was conducted over one commercial vehicle equipped with 3.5L GTDI engine and turbocharger under Federal Testing Procedure (FTP) with the catalyst brick placed on Under floor position paired with the common Close coupled (CC) catalyst brick. The $NO_x$/NMHC/CO emissions of the whole system under FTP testing cycles are summarized in Table 2. The system with Pd citrate demonstrates an additional emission reduction of 5 mg/mile for ($NO_x$+NMHC) and 65 mg/mile for CO compared to the system with Pd nitrate.

TABLE 2

| Catalyst | NOx (mg/mile) | NMHC (mg/mile) | CO (mg/mile) |
|---|---|---|---|
| Comparative Catalyst A | 29 | 18 | 469 |
| Catalyst B | 25 | 17 | 404 |

Figure 2:
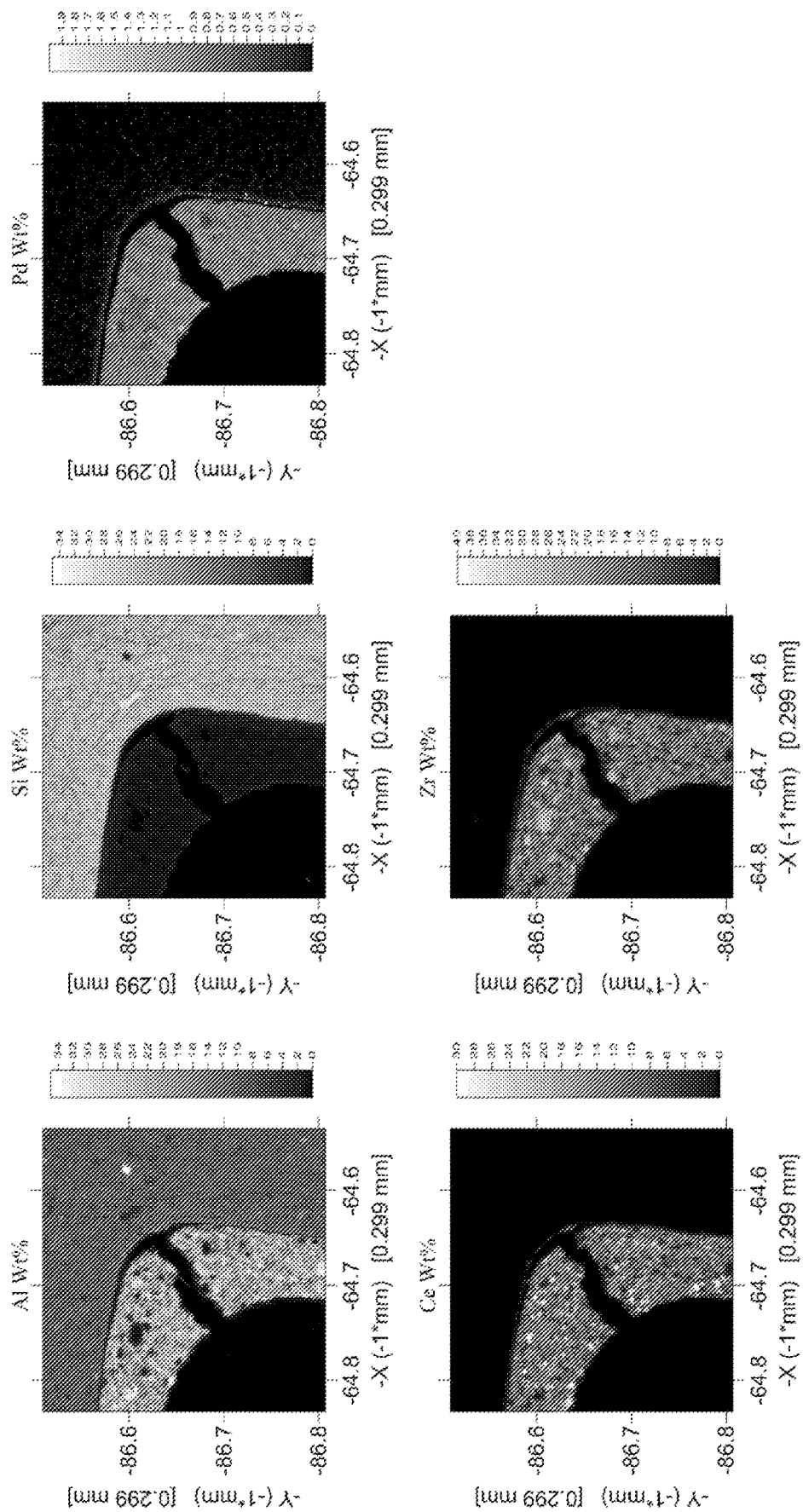
FIG. 2 shows the palladium distribution on a palladium nitrate coated core by EPMA method (Example 6).

Example 6: Performance Comparison of Catalyst Article of Present Invention vs. Conventional PGM Precursor When Using Zeolitic Support Material Comparative Catalyst C and Catalyst D with identical components, except for using different Pd precursors, were prepared by using the same washcoat slurry as described in catalysts A and B, were coated on monolithic extruded zeolite substrates (4.16"×4", 400/11, 55% beta zeolite). The 11/16"×1" core was aged on a lab pulsator for 50 hours, 4 mode cycling with temperature ranging from 740° C. to 840° C. Pd distribution on the aged core was characterized by EPMA (Electron Probe MicroAnalysis) method. The core made by Pd citrate of FIG. 1 has a relatively lower Pd concentration inside the substrate compared to Pd nitrate of FIG. 2, evidencing a less degree of Pd migration.

The full size catalyst was placed at the underbody position in a system and each system was aged for 100 hours with an average temperature of close-coupled brick at 875° C. The aged UB catalyst was subsequently paired with a common close-coupled catalyst (0:78:2) to form a new system and was tested on a Ford Flex vehicle equipped with a 3.5L GTDI engine and turbocharger. The $NO_x$/NMHC/CO emissions of the whole system under FTP testing cycles are summarized in Table 3. The system with Pd citrate demonstrates an additional emission reduction of 4 mg/mile for ($NO_x$+NMHC) and 104 mg/mile for CO compared to the system with Pd nitrate.

The results clearly demonstrate that using Pd citrate is able to minimize the Pd migration to the zeolite substrates, resulting in catalysts with improved performance.

TABLE 3

$NO_x$/NMHC/CO emissions over the system (common CCs/0:78:2 + different UBs/O:48:2) on a 3.5 L vehicle FTP testing cycle

| Catalyst | NOx (mg/mile) | NMHC (mg/mile) | CO (mg/mile) |
|---|---|---|---|
| Comparative Catalyst C | 32 | 13 | 468 |
| Catalyst D-TWC with Pd citrate | 27 | 14 | 364 |

Example 7: Light Off Performances and OSC Test in Synthetic Catalyst Activity Testing Comparative Catalyst E First Catalytic Region The first catalytic region consists of Pd supported on a washcoat of CeZr mixed oxide, La-stabilized alumina, and Ba promotor, Pd nitrate solution as Pd source was used during the washcoat slurry preparation, The washcoat loading of the first catalytic region was about 1.8 g/in$^3$ with a Pd loading of 24 g/ft$^3$.

This washcoat was then coated from the inlet face of a ceramic substrate (400 cpsi, 4.3 mil wall thickness, 4.66 inch in diameter and 4.5 inch in length) using standard coating procedures with coating depth targeted of 80% of the substrate length, dried at 100° C.

Second Catalytic Region

The second catalytic region consists of Rh supported on a washcoat of CeZr mixed oxide, and La-stabilized alumina. The washcoat loading of the second catalytic region was about 1.3 g/in$^3$ with a Rh loading of 4 g/ft$^3$.

This second washcoat was then coated from the outlet face of the ceramic substrate containing the first catalytic region from above, using standard coating procedures with coating depth targeted of 80% of the substrate length, dried at 100° C. and calcined at 500° C. for 45mins.

Catalyst F

Catalyst F is prepared according to the similar procedure as Comparative Catalyst E with the exception that in the first catalytic region, Pd citrate solution as Pd source was applied during washcoat slurry preparation in the first catalytic region.

Catalysts F and Comparative Catalyst E were tested separately over a Synthetic Catalyst Activity Test (SCAT) device. The light off performance is tested in a gas flow of 10 vol. % $H_2O$ +14 vol. % $CO_2$+333 ppm $C_3H_6$+167ppm $C_3H_8$+1.5 vol. % CO+0.5 vol. % $H_2O$ +1.15 vol. % $O_2$+1000 ppm NO balanced with $N_2$ (the space velocity was 60000 h$^{-1}$), and temperature ramp is 30° C/min. The conversion of THC, CO and $NO_x$ were calculated from comparing the concentration of the feed gas and the gas at the outlets of the catalysts. The OSC was test in a gas flow of 10 vol. % $H_2O$+14 vol. % $CO_2$+333ppm $C_3H_6$+167ppm $C_3H_8$+ 0.5 vol. % CO +0.5 vol. % $H_2O$+0.5 vol. % $O_2$+1000ppm NO balanced with $N_2$ (the space velocity was 60000 h$^{-1}$) at 450° C. Comparative Catalyst E and Catalyst F were hydrothermal aged for 4 hours in a 5 L/min flow of 2 vol. % $O_2$+10 vol. % $H_2O$ balanced with $N_2$ at 980° C.

The HC, CO and $NO_x$ $T_{50}$ light off temperatures and OSCs of aged Catalyst F and Comparative Catalyst E are shown in Table 4. The data indicates that, surprisingly, Catalyst F of the present invention gave significantly improved light-off performance when compared with Comparative Catalyst E, with about 23, 22.5 and 17.5° C. lower Tso (Tso is the temperature when the conversion reaching 50%) for CO, HC and $NO_x$, respectively. Meanwhile, the OSC of Catalyst F is about 30% higher than that of Comparative Catalyst E.

TABLE 4

SCAT Light Off and OSC Test Results

| | $T_{50}$ (° C.) | | | Oxygen Storage |
|---|---|---|---|---|
| | CO | HC | NOx | Capacity (mg) |
| Comparative Catalyst E | 261 | 268.5 | 253.5 | 10.0 |
| Catalyst F | 238 | 246 | 236 | 13.1 |

Example 8: Vehicle Testing Procedures and Results

Catalyst F and Comparative Catalyst E were bench aged for 100 hours with four modes of aging cycles, with peak temperature at 980° C. Vehicle emissions were conducted over a commercial vehicle equipped with 1.6L turbo under Worldwide Light Duty Testing Procedure (WLTP) with brick placed on CC position. Emissions were measured pre- and post-catalyst. The diluted bag emission data from the tailpipe over the vehicle are shown in Table 5.

TABLE 5

Vehicle Exhaust Emission Results over WLTP

| | Exhaust Emissions (mg/km) | | | |
|---|---|---|---|---|
| | THC | NMHC | CO/10 | NOx |
| Comparative Catalyst E | 55.5 | 45.2 | 61.5 | 104.7 |
| Catalyst F | 44.9 | 36.2 | 43.9 | 86.5 |

Bag data from the tailpipe of testing vehicle A are shown in Table 5. Catalyst F of the present invention presents obviously lower emission of THC, NMHC, CO, and $NO_x$ compared with Comparative Catalyst E (19%, 20%, 29%, and 17% reduction, respectively).

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A method of manufacturing a catalyst article, the method comprising:
   providing a PGM hydroxide and/or a water-insoluble PGM salt;
   contacting the PGM hydroxide and/or water-insoluble PGM salt with an aqueous carboxylic acid solution; and optionally
   recovering an anionic complex in the form of an aqueous solution comprising an anionic complex comprising a PGM and a carboxylate ion, wherein the carboxylate ion comprises a hydroxyl group;
   providing a support material;
   applying the anionic complex to the support material to form a loaded support material;
   disposing the loaded support material on a substrate; and
   heating the loaded support material to form nanoparticles of the PGM on the support material.

2. The method of claim 1, wherein the PGM of the PGM hydroxide is rhodium and/or platinum, and/or the PGM of the water-insoluble PGM salt.

3. The method of claim 1, wherein the substrate is in the form of a honeycomb monolith, a wall flow filter or a flow through filter.

4. A catalyst article obtainable by the method of claim 1, the catalyst article for use in an emission treatment system.

5. The catalyst article of claim 4 for three-way catalysis, diesel oxidation catalysis, or NOx trap catalysis.

6. An emission treatment system comprising the catalyst article of claim 4.

7. The emission treatment system of claim 6 for a gasoline engine.

8. A method of treating an exhaust gas, the method comprising:
   providing the catalyst article of claim 4; and
   contacting the catalyst article with an exhaust gas.

9. The method of claim 1, wherein the carboxylate ion comprises two or more carboxyl functional groups.

10. The method of claim 1, wherein the carboxylate ion comprises from 2 to 6 carbon atoms.

11. The method of claim 1, wherein the carboxylate ion comprises an alpha-hydroxy acid functional group.

12. The method of claim 1, wherein the carboxylate ion comprises one or more of citrate, malate, tartrate, tartronate, lactate and glycolate.

13. The method of claim 1, wherein the carboxylate ion comprises citrate.

14. The method of claim 1, wherein the PGM is selected from one or more of rhodium, palladium, platinum and ruthenium.

15. The method of claim 14, wherein the PGM comprises rhodium, palladium, platinum or a combination thereof, preferably rhodium and/or palladium.

16. The method of claim 1, wherein the anionic complex comprises one or more of Pt (IV) malonate, Pt (IV) succinate, Pt (II, IV) oxalate, Pd (II) citrate, Pd (II) lactate, Pd (II) oxalate, Pd (II) glycolate, Pd (II) malate, Rh (II) citrate, Rh (III) citrate, Rh (II) lactate, Rh (III) lactate and Ru (III) oxalate.

17. The method of claim 1, wherein the anionic complex is provided in the form of an aqueous solution comprising the anionic complex.

18. The method of claim 17, wherein the aqueous solution does not comprise a PGM nitrate.

19. The method of claim 1, wherein the support material comprises one of more of $Al_2O_3$, $TiO_2$, $CeO_2$, $ZrO_2$, $CeO_2$—$ZrO_2$, $V_2O_5$, $La_2O_3$ and zeolites.

* * * * *